United States Patent
Wada

[19]

[11] Patent Number: 6,145,627
[45] Date of Patent: Nov. 14, 2000

[54] ZERO POINT POSITION-DETERMINING MECHANISM FOR PRESSURIZED FLUID-DRIVEN APPARATUSES

[75] Inventor: Toshiharu Wada, Tsukuba, Japan

[73] Assignee: SMC Kabushiki Kaisha, Tokyo, Japan

[21] Appl. No.: 09/271,366

[22] Filed: Mar. 18, 1999

[30] Foreign Application Priority Data

Apr. 6, 1998 [JP] Japan .................................. 10-093302

[51] Int. Cl.[7] ....................................................... F16N 7/34
[52] U.S. Cl. .......................... 184/57; 184/55.1; 184/55.2; 137/205.5; 16/441; 239/338; 261/78.2
[58] Field of Search .................. 184/55.1, 55.2, 184/57; 137/205.5, 268, 564.5; 16/441; 239/337, 338, 340, 373; 261/35, 78.2, DIG. 35

[56] References Cited

U.S. PATENT DOCUMENTS

| | | | |
|---|---|---|---|
| 3,023,849 | 3/1962 | Tine | 184/55.2 |
| 3,511,341 | 5/1970 | German et al. | 184/55.1 |
| 3,605,949 | 9/1971 | Vock | 184/55.2 |
| 3,707,204 | 12/1972 | Dussardier | 184/55.2 |
| 3,720,290 | 3/1973 | Lansky et al. | 184/55.2 |
| 4,461,425 | 7/1984 | Miller | 239/338 |
| 4,733,753 | 3/1988 | Miyake | 184/55.2 |
| 4,735,288 | 4/1988 | Uematsu et al. | 184/55.2 |
| 4,807,721 | 2/1989 | Fujiwara | 184/55.2 |
| 5,086,878 | 2/1992 | Swift | 184/55.2 |
| 5,490,576 | 2/1996 | Huang | 184/55.2 |
| 5,653,310 | 8/1997 | Young | 184/55.2 |
| 5,725,073 | 3/1998 | Zhou | 184/55.2 |

FOREIGN PATENT DOCUMENTS

16002  7/1902  United Kingdom ................. 184/55.1

*Primary Examiner*—David A. Bucci
*Assistant Examiner*—Chong H. Kim
*Attorney, Agent, or Firm*—Oblon, Spivak, McClelland, Maier & Neustadt, P.C.

[57] ABSTRACT

A pressure fluid-driven apparatus includes a zero point position-determining mechanism, including an oil supply-adjusting knob formed with an arrow-shaped recess for indicating a zero point position, an insert member internally fitted into a hole of the oil supply-adjusting knob, a stopper for setting an assembled state of the oil supply-adjusting knob and the insert member to be at a zero point position, and a first spline section and a second spline section fitted to one another to determine the position so that the zero point position of the recess corresponds to that of a holder.

6 Claims, 8 Drawing Sheets

ZERO POINT POSITION-DETERMINING MECHANISM FOR PRESSURIZED FLUID-DRIVEN APPARATUSES

BACKGROUND OF THE INVENTION

1. Field of the Invention

The present invention relates to a zero point position-determining mechanism for pressurized fluid-driven apparatuses, which is applied to a pressurized fluid-driven apparatus such as a lubricator and which makes it possible to determine the position of a state in which the amount of dripped oil is zero.

2. Description of the Related Art

Figure 9:
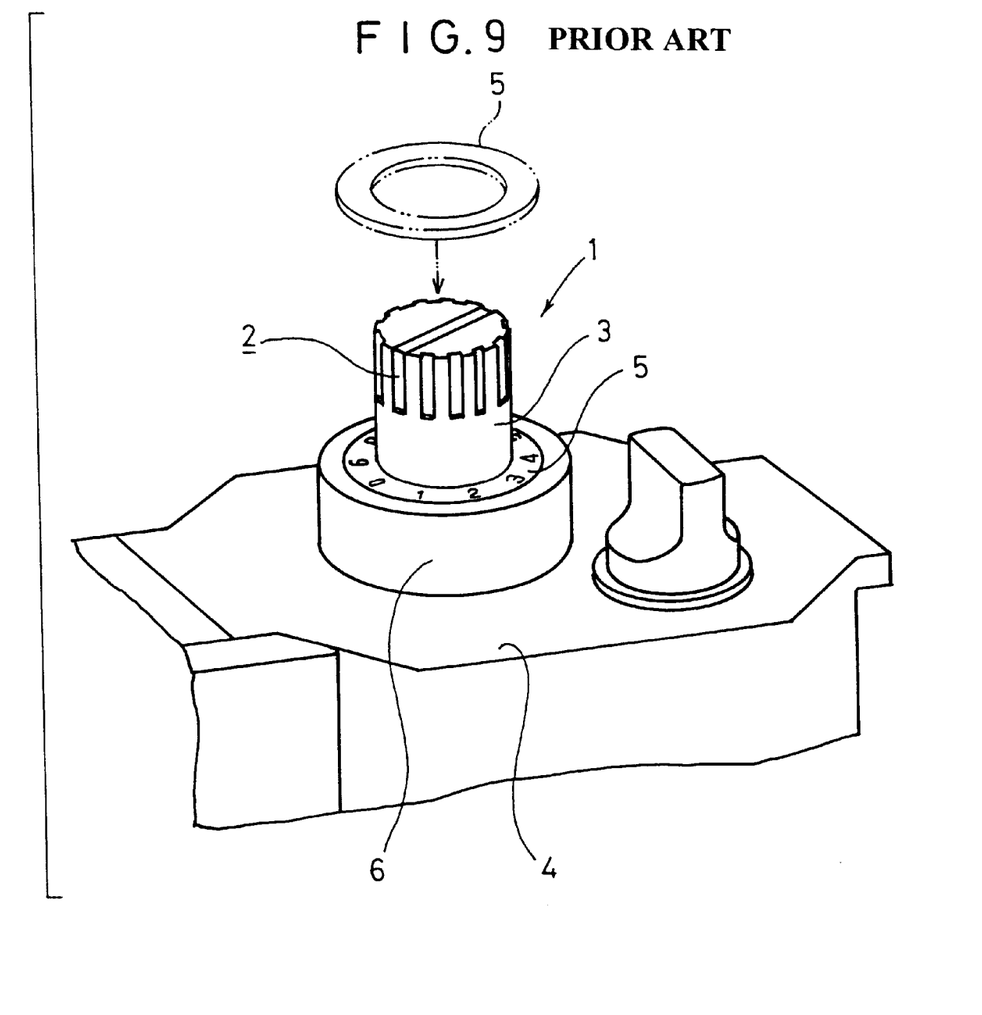
FIG. 9 shows, with partial omission, a perspective view illustrating a zero point mechanism of a lubricator concerning the conventional technique.

FIG. 9 shows a zero point mechanism of a lubricator concerning a conventional technique. The zero point mechanism 1 includes, at its outer circumference, a knob 3 formed with recesses 2 for indicating the lubrication amount or the oil supply amount. The knob 3 is rotatably supported with respect to a body 4. A ring-shaped scale plate 5, which surrounds the knob 3, is installed on the upper surface of the body 4.

The process for assembling the zero point mechanism 1 concerning the conventional technique will be briefly explained. At first, the knob 3 is rotatably assembled to the body 4. After that, the scale of "0" marked on the scale plate 5 is adjusted to the recess 2 of the knob 3, and thus the scale plate 5 is fixed to an annular projection 6 provided on the upper surface of the body 4.

However, in the case of the zero point mechanism 1 concerning the conventional technique described above, the position of the recess 2 for indicating the lubrication amount is diverse, and it is not unified depending on the situation or degree of the knob 3 assembled with respect to the body 4. In other words, the assembling operation is not performed in a state in which the recess 2 of the knob 3 is positioned at a predetermined position. In the conventional technique, a method is adopted, in which the zero point position (scale of "0") of the scale plate 5 is adjusted to the position of the recess 2 after the knob 3 is assembled, and then the scale plate 5 is fixed to the upper surface of the body 4.

Therefore, the zero point position of the scale plate 5 fixed on the upper surface of the body 4 is not mutually unified among identical products. For this reason, when an operator grips the knob 3 to adjust the lubrication amount (dripping amount of oil), it is impossible to easily perform the operation, resulting in an inconvenience that the operability is inferior.

SUMMARY OF THE INVENTION

A general object of the present invention is to provide a zero point position-determining mechanism for pressurized fluid-driven apparatuses, which makes it possible to set the zero point position by using a simple structure.

A principal object of the present invention is to provide a zero point position-determining mechanism for pressurized fluid-driven apparatuses, which makes it possible to further improve the operability of the pressurized fluid-driven apparatus by determining the zero point position.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
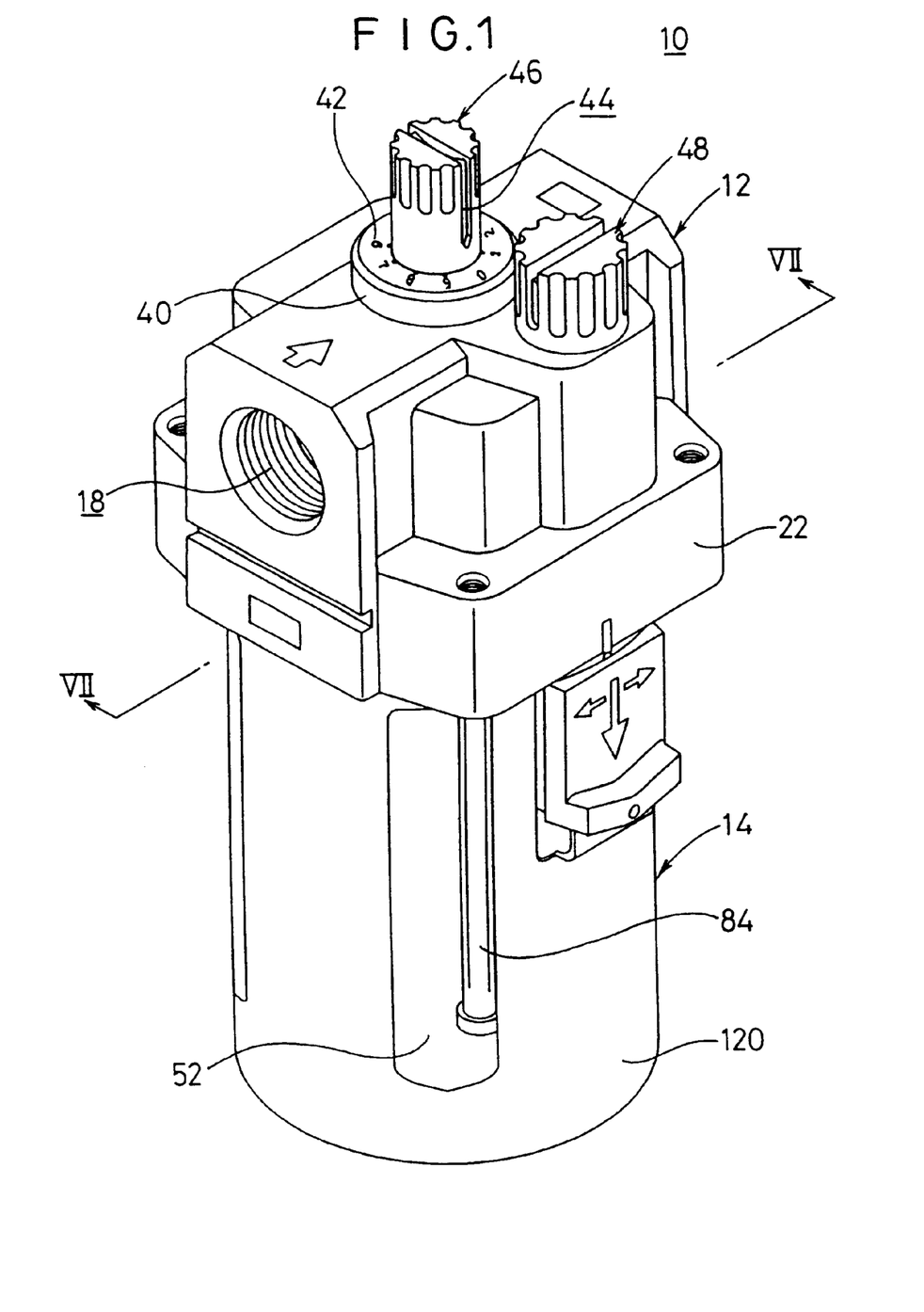
FIG. 1 shows a perspective view illustrating a lubricator to which a zero point position-determining mechanism according to an embodiment of the present invention is applied.

With reference to FIG. 1, reference numeral 10 indicates a lubricator to which a zero point position-determining mechanism according to an embodiment of the present invention is applied. In the following description, the term "zero point position" refers to a state in which the lubrication amount or the oil supply amount of the lubricating oil (dripping oil amount) is zero.

The lubricator 10 comprises a body section 12 provided on the upper side, and a case section 14 provided on the lower side.

Figure 2:
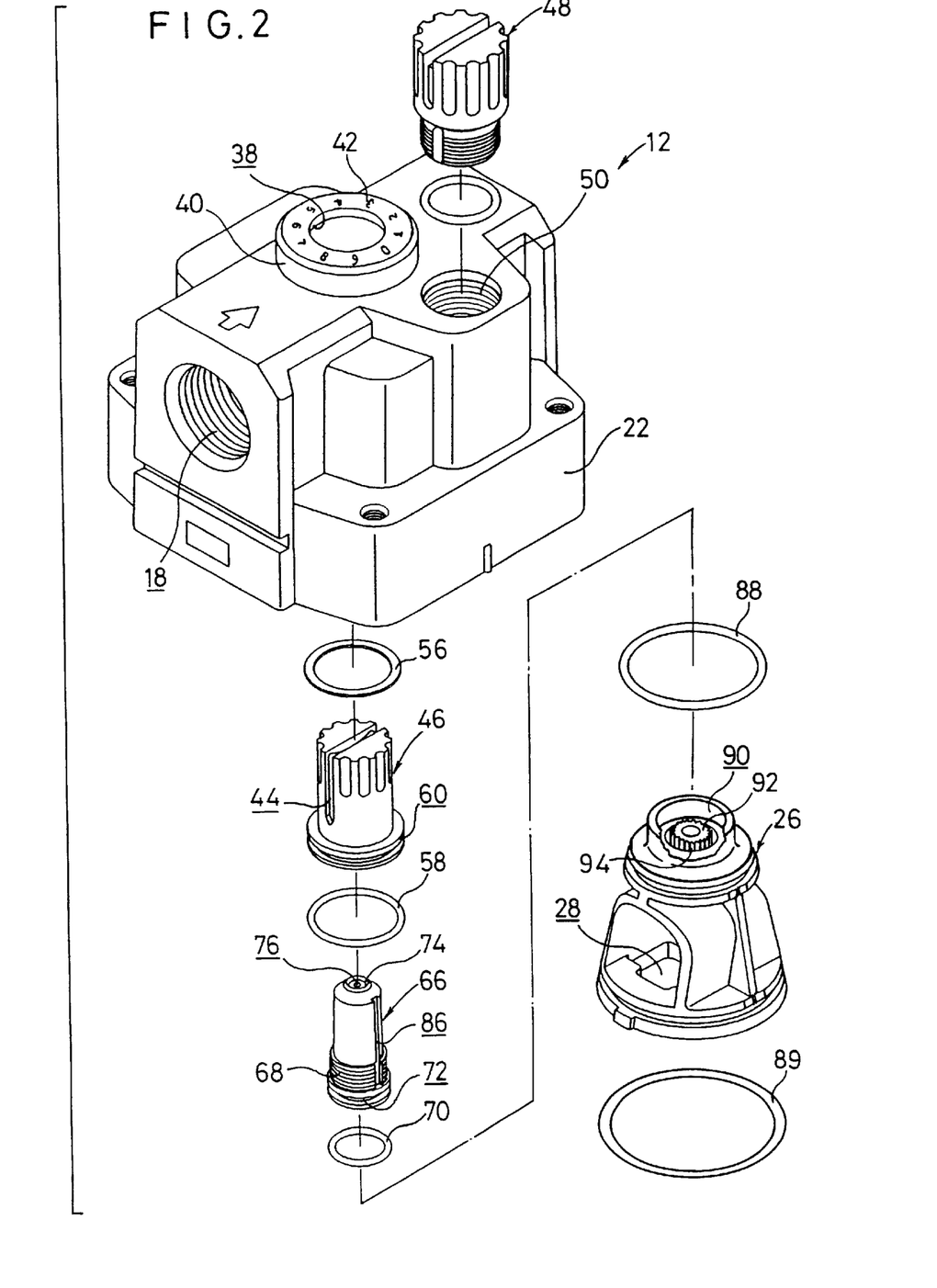
FIG. 2 shows an exploded perspective view illustrating a body section of the lubricator shown in FIG. 1.
Figure 3:
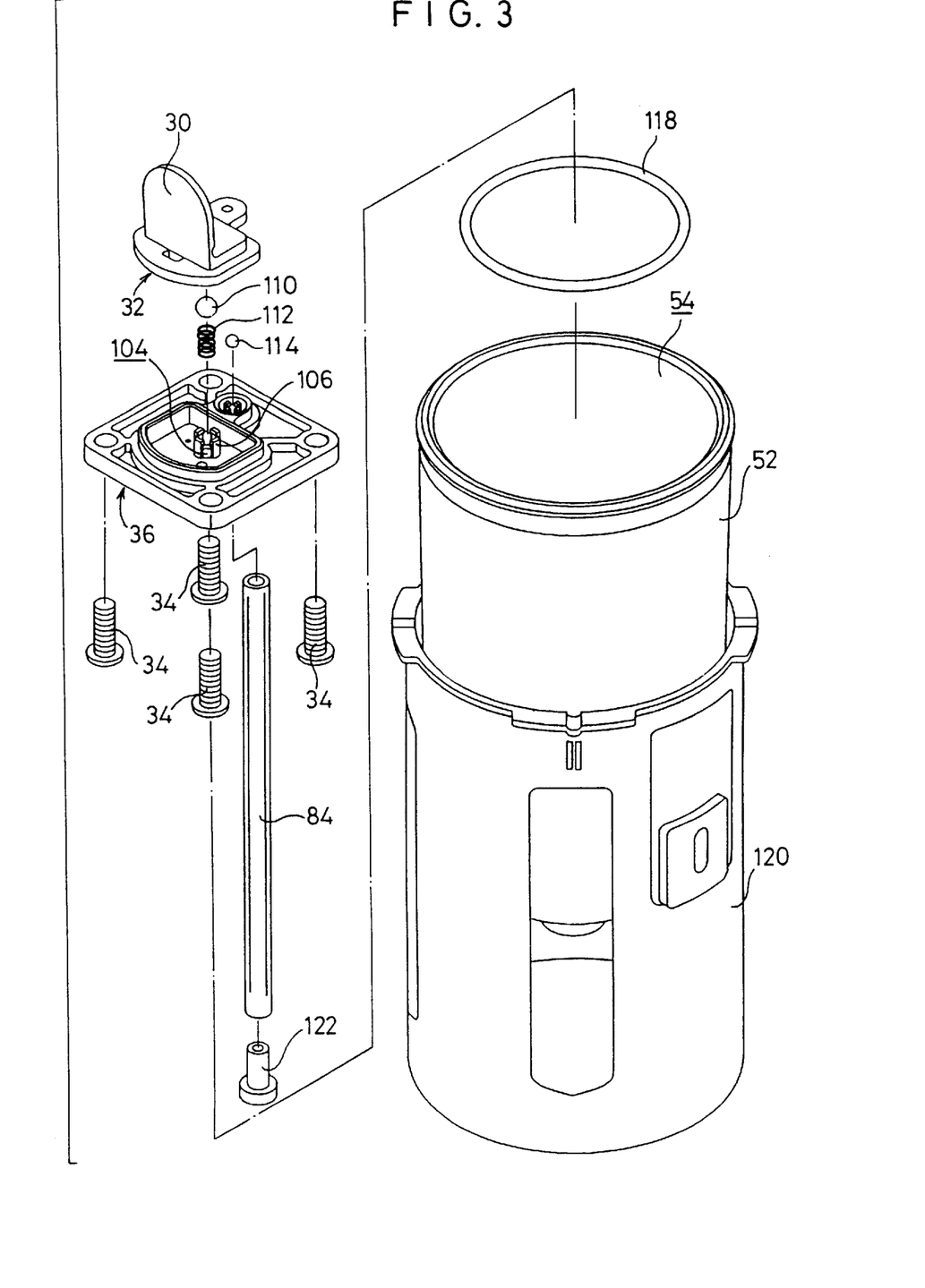
FIG. 3 shows an exploded perspective view illustrating a case section of the lubricator shown in FIG. 1.
Figure 7:
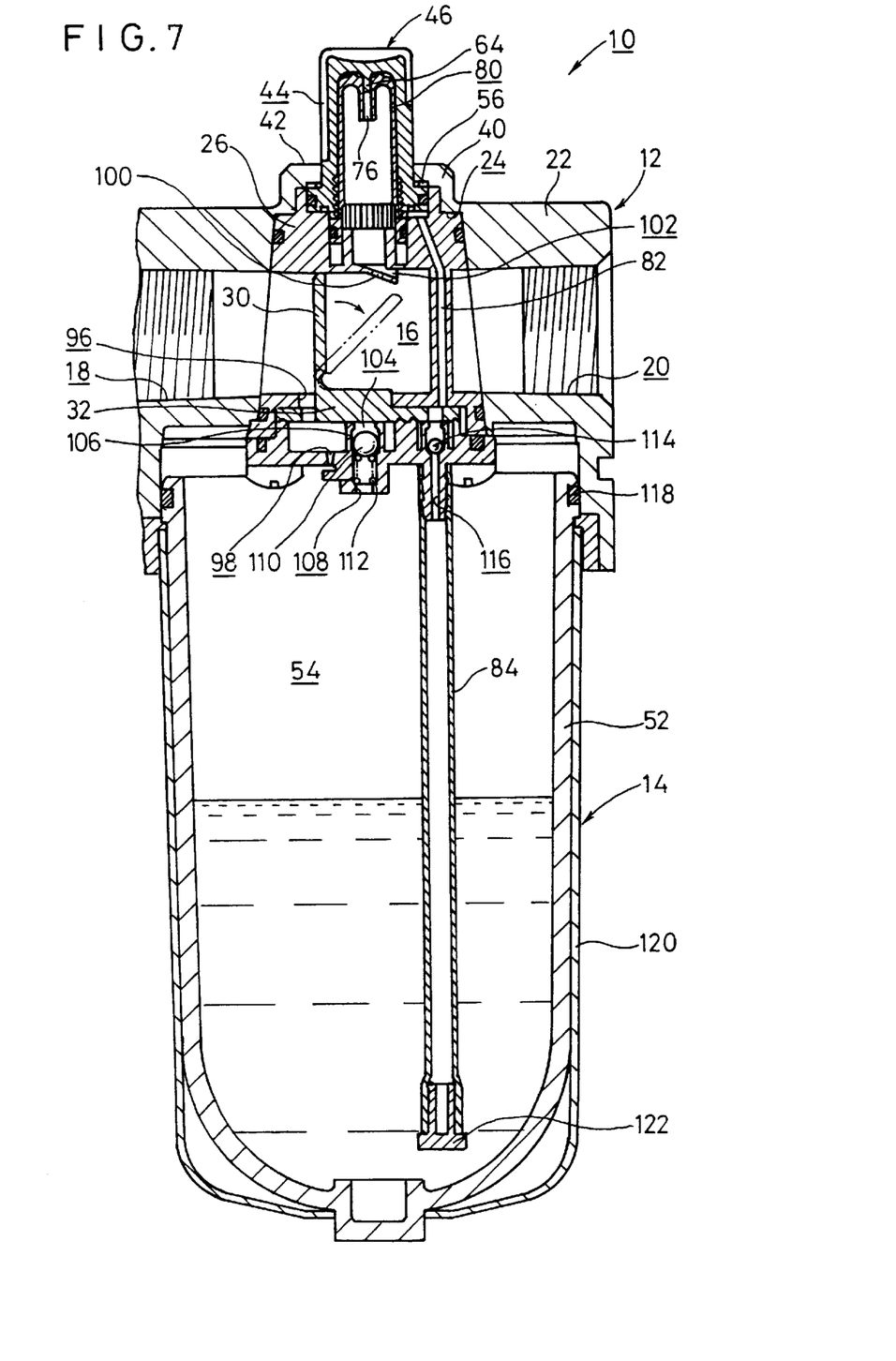
FIG. 7 shows a longitudinal sectional view taken along a line VII—VII shown in FIG. 1.

As shown in FIG. 2, the body section 12 includes a fluid passage 16 which extends in the horizontal direction (see FIG. 7). The body section 12 further includes a block member 22 which has a pressure fluid-introducing port 18 formed at one end of the fluid passage 16 and a pressure fluid discharge port 20 formed at the other end on the side opposite to the pressure fluid-introducing port 18, and a holder 26 which has its upper portion to be engaged with a recess 24 (see FIG. 7) formed at the inside of the block member 22. As shown in FIG. 3, a flexible member 32, which has a semielliptic tongue 30 and which is formed of, for example, urethane rubber, is installed to a hole 28 formed through the bottom surface of the holder 26. The holder 26 and the flexible member 32 are held by an attachment plate 36 which is fastened by screws to the block member 22 by the aid of a plurality of screw members 34.

Figure 4:
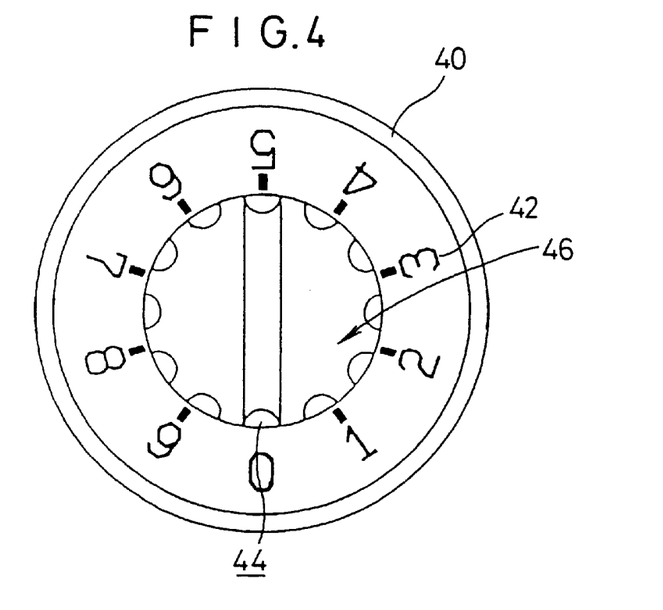
FIG. 4 shows a plan view illustrating an oil supply-adjusting knob provided on the lubricator shown in FIG. 1.
Figure 5:
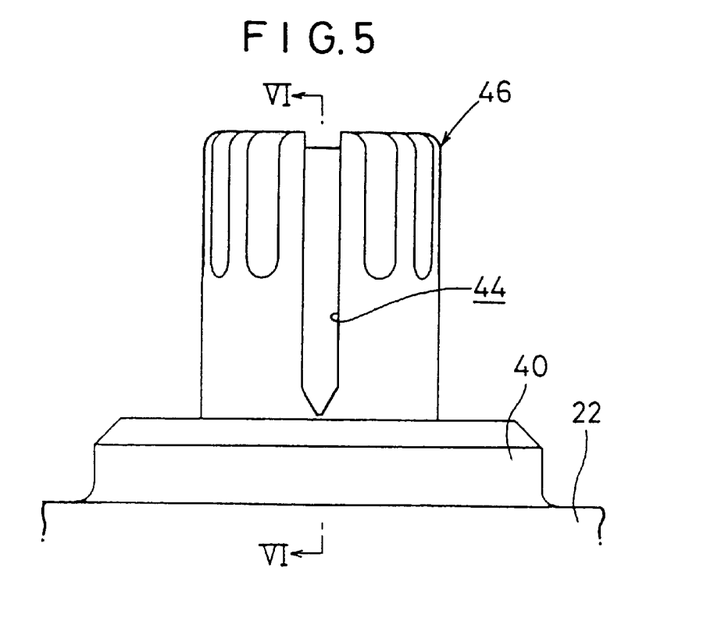
FIG. 5 shows a front view illustrating the oil supply-adjusting knob shown in FIG. 4.

As shown in FIG. 2, an annular projection 40, which has a central through-hole 38, is formed to expand on the upper surface of the block member 22. As shown in FIG. 4, a plurality of oil supply-adjusting scales 42, which are separated from each other by a predetermined angle, are previously marked on the annular projection 40. An oil supply-adjusting knob 46, which is engraved with an arrow-shaped recess 44 (see FIG. 5) for indicating the zero point position on the outer circumferential surface, is inserted into the through-hole 38 so that the oil supply-adjusting knob 46 protrudes upwardly. The oil supply-adjusting knob 46 is provided rotatably in positive and negative directions in accordance with the gripping action effected by an operator. A ring-shaped spacer 56 is interposed between the oil supply-adjusting knob 46 and the annular projection 40 of the block member 22 (see FIG. 2).

An oil supply plug 48 is detachably attached to the upper surface of the block member 22. The oil supply plug 48 can be removed to supply the lubricating oil into a chamber 54 of the case 52 described later on, via a port 50 provided through the block member 22.

Figure 6:
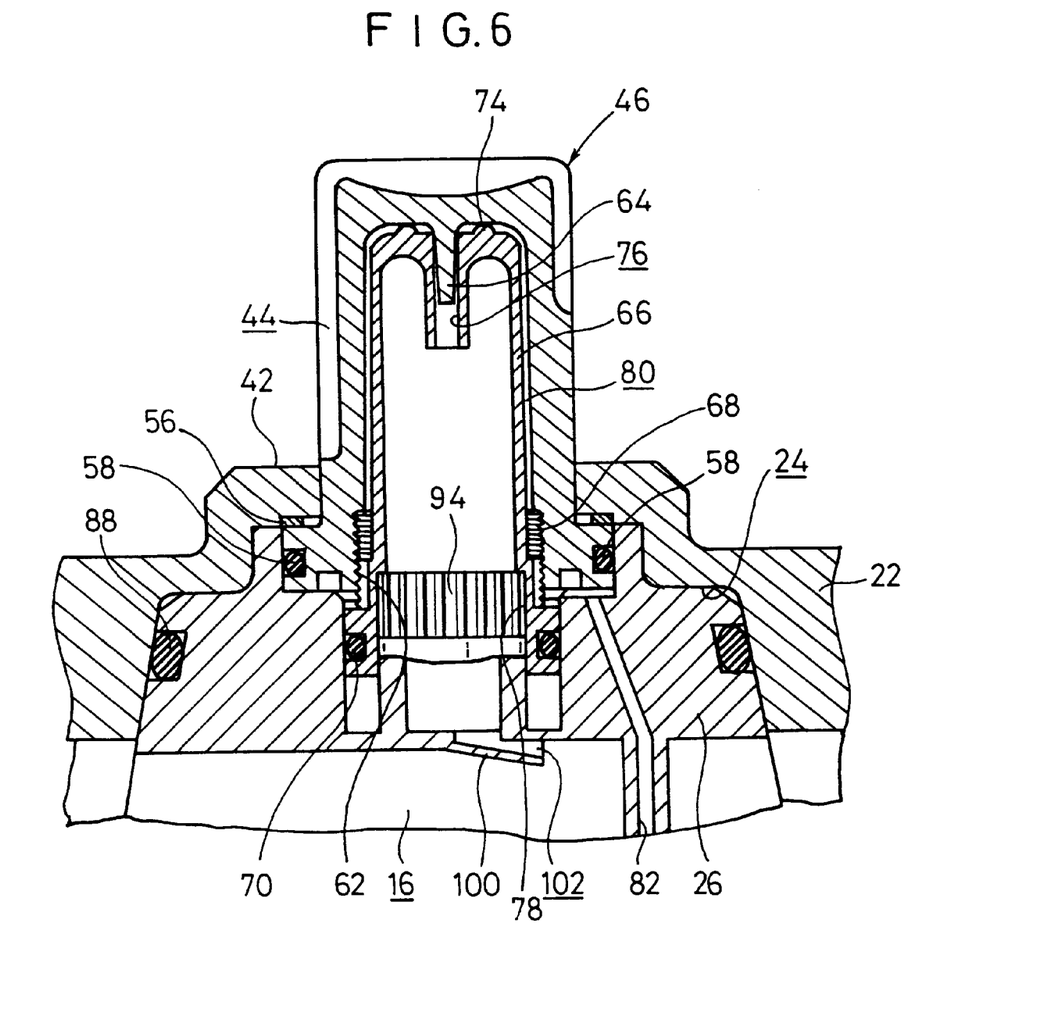
FIG. 6 shows a longitudinal sectional view taken along a line VI—VI shown in FIG. 5.

As shown in FIGS. 2 and 6, an annular groove 60, which is provided to install an O-ring 58 that functions as a seal, is formed on a flange on the lower side of the oil supply-adjusting knob 46. A female thread 62 is formed on the lower side of the inner circumferential surface thereof. A needle 64, which protrudes downwardly by a predetermined length, is formed at an upper portion of the inner wall surface of the oil supply-adjusting knob 46. The needle 64 is formed such that its diameter is gradually reduced downwardly.

A cylindrical insert member 66 having its bottom is installed to a hole formed at the inside of the oil supply-adjusting knob 46. A male thread 68, which is fitted to the female thread 62 of the oil supply-adjusting knob 46, is formed on the outer circumferential surface on the lower side of the insert member 66. An annular groove 72 for installing an O-ring 70 is formed in the vicinity of the male thread 68. An annular stopper 74 is formed to expand on the upper surface of the insert member 66. The stopper 74 functions as follows. That is, when the insert member 66 is screwed into the oil supply-adjusting knob 46, the stopper 74 abuts against the inner wall surface of the hole of the oil supply-adjusting knob 46. Thus, the screwing amount of the insert member 66 with respect to the oil supply-adjusting knob 46 is regulated to set the dripping oil amount to be at the zero point position.

A needle-inserting hole 76 for inserting the needle 64 thereinto is formed on the upper surface of the insert member 66. On the other hand, a first spline section 78 (see FIG. 8), which is formed with a plurality of spline grooves extending in the axial direction over the circumferential direction, is provided on the inner wall surface on the lower side of the insert member 66.

In this embodiment, as shown in FIG. 6, a gap 80 is formed between the oil supply-adjusting knob 46 and the insert member 66. The lubricating oil, which flows along the gap 80, is adjusted for its dripping amount depending on the degree of insertion of the needle 64 into the needle-inserting hole 76 as described later on. The gap 80 is provided to communicate with a passage 82 which is formed through the holder 26. The passage 82 is formed to communicate with a conduit 84 as described later on.

The apparatus may be designed such that the lubricating oil, which is supplied through the conduit 84 and the passage 82, passes through a clearance at the fitted portion between the female thread 62 of the oil supply-adjusting knob 46 and the male thread 68 of the insert member 66, and it flows into the gap 80. Alternatively, as shown in FIG. 2, a passage 86 for allowing the lubricating oil to flow therethrough may be formed as a cutout disposed in the axial direction.

As shown in FIG. 2, a pair of O-rings 88, 89, which have different diameters respectively, are installed to annular grooves formed on the upper side and the bottom side of the holder 26. An annular projection 92 is provided at a central portion of an opening 90 disposed on the upper side of the holder 26. A second spline section 94, which is formed with a plurality of spline grooves extending along the axial direction over the circumferential direction, for being fitted to the first spline section 78 of the insert member 66, is provided on the outer circumferential surface of the annular projection 92.

In this embodiment, the first spline section 78 and the second spline section 94 function as positioning means. When the first spline section 78 and the second spline section 94 are fitted to one another, then the insert member 66 is held in a state in which it is positioned at a predetermined position with respect to the holder 26, and the oil supply-adjusting knob 46 is provided rotatably by a predetermined amount (for example, three turns and a half) in any of the positive and negative directions about the shaft of rotation of the insert member 66 fixed to the holder 26.

As shown in FIG. 7, the flexible member 32 is formed with a fixed throttle or orifice 98 which communicates with the pressure fluid-introducing port 18 via a passage 96, for regulating the pressure fluid supplied from the pressure fluid-introducing port 18 to have a predetermined flow rate. The pressure fluid, which has passed through the fixed throttle 98, is introduced into the chamber 54 of the case 52, and it functions to press the oil surface of the lubricating oil downwardly.

The tongue 30 of the flexible member 32, which is formed to have the semielliptic configuration, is usually in a state of standing vertically in the fluid passage 16. On the other hand, the tongue 30 is formed so that it is deformed in accordance with the action of the pressure fluid supplied from the pressure fluid-introducing port 18, and it is inclined in a direction indicated by the arrow (see two-dot chain lines in FIG. 7).

As shown in FIG. 7, the holder 26 is provided with an inclined surface section 100 which is inclined by a predetermined angle toward the fluid passage 16. The lubricating oil, which falls to the inclined surface section 100 to be scattered thereby, is led through a window 102 to the fluid passage 16.

As shown in FIG. 3, a cylindrical section 106, which has a plurality of slits 104 at its side circumference, is formed at a central portion of the upper surface of the attachment plate 36. A through-hole 108 (see FIG. 7) is formed under the cylindrical section 106. As shown in FIG. 7, the through-hole 108 is formed such that it communicates with the pressure fluid-introducing port 18 via the passage 96 and the fluid passage 16 and it also communicates with the chamber 54 in the case 52. A seat section, which is provided for closing the through-hole 108 by the aid of a first ball member 110 to be seated thereon, is formed at one end of the cylindrical section 106. The first ball member is always urged upwardly in accordance with the action of the resilient force of a spring 112. Thus, the first ball member 110 is in a state of being pressed in a direction to make separation from the seat section.

In this embodiment, when the pressure in the chamber 54 is smaller than the pressure (primary pressure) on the side of the pressure fluid-introducing port 18, the first ball member 110 is seated on the seat section in opposition to the resilient force of the spring 112 so that the through-hole 108 is closed. On the other hand, for example, when the supply of the pressure fluid on the primary side is stopped, and the pressure in the chamber 54 is larger than the pressure (primary pressure) on the side of the pressure fluid-introducing port 18, then the first ball member 110 is separated from the seat section in accordance with the action of the resilient force of the spring 112 to open the through-hole 108. As described above, the first ball member 110 functions to quickly exhaust the pressure remaining in the chamber 54 by the aid of the passage 96 which communicates with the pressure fluid-introducing port 18.

As shown in FIGS. 3 and 7, a seat section, on which a second ball member 114 that is smaller than the first ball member 110 is seated, is formed to expand on the upper surface of the attachment plate 36 disposed in the vicinity of the cylindrical section 106. A through-hole 116, which communicates with the passage 82, is formed on the lower side of the seat section.

The case section 14 is installed to the bottom surface of the block member 22 with an O-ring 118 interposed therebetween. The case section 14 includes the case 52 which has the chamber 54 formed therein, and a case guard 120 which is formed to surround the case 52 for protecting the case 52. The conduit 84, which communicates with the through-hole 116 for seating the second ball member 114 thereon, is connected to a bottom surface portion of the attachment plate 36. An element 122 is installed to one end of the conduit 84.

The lubricator 10, to which the zero point position-determining mechanism according to the embodiment of the present invention is applied, is basically constructed as described above. Next, its operation, function, and effect will be explained.

At first, the assembling step for the lubricator 10 will be explained.

As shown in FIG. 2, the insert member 66 is inserted into the hole of the oil supply-adjusting knob 46. The female thread 62 formed on the inner circumferential surface of the oil supply-adjusting knob 46 is fitted to the male thread 68 formed on the outer circumferential surface of the insert member 66.

In this embodiment, the needle 64 provided for the oil supply-adjusting knob 46 is inserted into the needle-inserting hole 76 of the insert member 66 by increasing the screwing amount of the male thread 68 into the female thread 62. The stopper 74 of the insert member 66 abuts against the inner wall surface of the oil supply-adjusting knob 46, and thus the screwing amount is regulated to make setting to the zero point position at which the oil supply amount is zero. As a result, the stopper 74 can be used to conveniently set the zero point position, and it is possible to avoid any excessive tightening.

Figure 8:
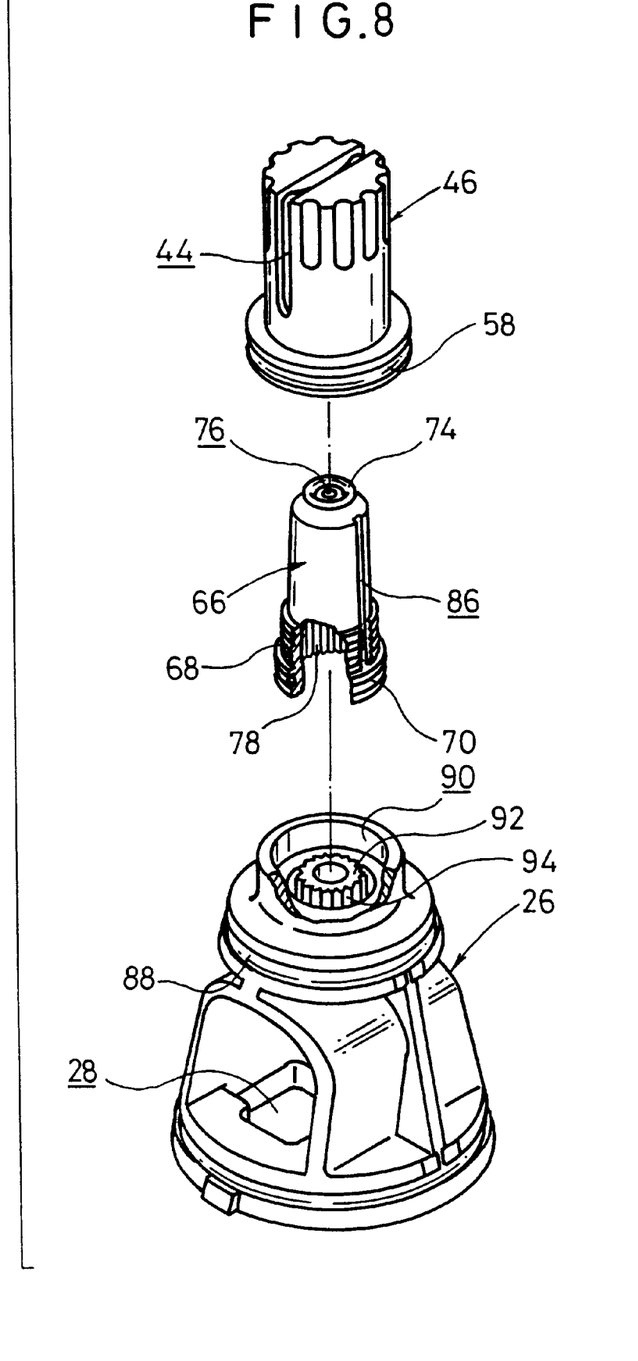
FIG. 8 shows an explanatory view illustrating the assembling step.

Next, as shown in FIG. 8, the oil supply-adjusting knob 46 and the insert member 66, which are assembled in an integrated manner, are installed to the opening 90 of the holder 26. During this process, the second spline section 94 formed on the outer circumferential surface of the annular projection 92 of the holder 26 is fitted to the first spline section 78 formed on the inner circumferential surface of the insert member 66. In this embodiment, for example, an unillustrated mark for indicating the zero point position is provided at a portion of the holder 26 in the vicinity of the annular projection 92 so that the first spline section 78 and the second spline section 94 are fitted to one another while adjusting the recess 44 having the arrow-shaped configuration for indicating the zero point position formed on the oil supply-adjusting knob 46 with respect to the mark described above. In this embodiment, it is assumed that the unillustrated mark is provided at the position corresponding to "0" of the oil supply-adjusting scale 42.

The oil supply-adjusting knob 46 and the insert member 66, which are assembled to the holder 26 as described above, are inserted into the block member 22 from a position thereunder to assemble them so that the oil supply-adjusting knob 46 protrudes from the through-hole 38. In this embodiment, the arrow-shaped recess 44 for indicating the zero point position, which is formed on the oil supply-adjusting knob 46, is in a state of having been already positioned at the zero point position. Thus, the components are assembled such that the zero point indication of the oil supply-adjusting scale 42 engraved on the annular projection 40 of the block member 22 corresponds to the recess 44 of the oil supply-adjusting knob 46. As described above, the lubricator 10, to which the zero point position-determining mechanism according to the embodiment of the present invention is applied, is assembled in the assembling step in the state in which the zero point position, at which the dripping amount of the lubricating oil is zero, is positioned. Accordingly, the lubricator 10 is shipped to the users as products all of which are uniform concerning the zero point position. Therefore, for example, when a preparatory operation is performed to assemble the lubricator 10 into a fluid circuit, the operator can carry out the operation for adjusting the lubricator in a uniform manner. Thus, the operability of the lubricator 10 is improved. Further, the individual products are not different in zero point position, and all of them are unified. Therefore, the operation can be performed conveniently even when the operator is not a skillful operator.

When the lubricator 10 is used, the oil supply plug 48 is removed from the block member 22, and then the chamber 54 of the case 52 is charged with a predetermined amount of the lubricating oil via the port 50 formed through the block member 22. As shown in FIG. 7, a part of the pressure fluid (hereinafter referred to as "compressed air"), which is introduced through the pressure fluid-introducing port 18 in accordance with the energizing action of an unillustrated pressure fluid supply source, passes through the fluid passage 16, the passage 96, and the fixed throttle 98 which communicate with each other, and it is supplied to the chamber 54 of the case 52. The oil surface of the lubricating oil is pressed downwardly in accordance with the action of the compressed air.

Therefore, the lubricating oil, which is charged in the chamber 54, rises along the conduit 84 to lift up the second ball member 114, and it flows through the passage 82. After that, the lubricating oil is introduced into the gap 80 between the oil supply-adjusting knob 46 and the insert member 66. The lubricating oil finally passes through the clearance formed by the needle 64 inserted into the needle-inserting hole 76, and thus a predetermined amount of the lubricating oil is dripped. The dripped lubricating oil falls to the inclined surface section 100. The scattered lubricating oil passes through the window 102, and it is introduced into the fluid passage 16. The amount of the dripped lubricating oil is previously adjusted by operating and rotating the oil supply-adjusting knob 46 by the operator.

On the other hand, the compressed air, which is introduced from the pressure fluid-introducing port 18, presses the tongue 30 of the flexible member 32 which stands substantially perpendicularly in the fluid passage 16 so that the tongue 30 is inclined as shown by the two-dot chain lines in FIG. 7. Therefore, the lubricating oil, which is scattered into the fluid passage 16 through the window 102, is in a form of mist in accordance with the flow of the compressed air flowing through the fluid passage 16. The lubricating oil is mixed with the compressed air, and it is discharged from the pressure fluid discharge port 20.

When the compressed air flowing through the fluid passage 16 is shut off, the first ball member 110 is pressed by the spring 112 to make displacement upwardly in accordance with the difference in pressure between the chamber 54 of the case 52 and the fluid passage 16. Therefore, the first ball member 110 is separated from the seat section, and the fluid passage 16 communicates with the chamber 54 of the case 52 via the through-hole 108. Thus, the compressed air remaining in the chamber 54 is exhausted. As a result, the lubricating oil can be prevented from any unnecessary supply to the fluid passage 16 via the conduit 84, which would be otherwise caused by the action of the compressed air remaining in the chamber 54 of the case 52.

What is claimed is:

1. A pressure fluid-driven apparatus having a zero point position-determining mechanism disposed therewith, comprising:

a knob member provided rotatably on the pressure fluid-driven apparatus and formed with an indicator section for indicating a zero point position;

insert member internally fitted into a hole of said knob member;

a zero point position-setting member for regulating a screwing amount between said knob member and said insert member so that a dripping oil amount to be supplied into a fluid passage of said pressure fluid-driven apparatus is zero; and a positioning member for positioning and holding said insert member so that said indicator section for indicating said zero point position of said knob member coincides with a zero point position of a scale provided on said pressure fluid-driven apparatus;

wherein said positioning member includes a first engaging section formed on said insert member and a second engaging section formed on said pressure fluid-driven apparatus; and wherein said zero point position for said knob member indicated by said indicator section and said zero point position of said scale provided on said pressure fluid-driving apparatus are positioned so that they are coincident with each other by fitting said first engaging section and said second engaging section to one another;

wherein said first engaging section includes a first spline section formed on an inner circumferential surface of said insert member and provided with spline grooves extending along an axial direction over a circumferential direction, and said second engaging section includes a second spline section formed on an outer circumferential surface of an annular projection of a member for constructing said pressure fluid-driven apparatus and provided with spline grooves extending along said axial direction over a circumferential direction.

2. The apparatus according to claim 1, wherein said zero point position-setting member comprises an annular stopper formed at one end of said insert member, said stopper abuts against an inner wall surface of said hole of said knob member to regulate said screwing amount between a female thread formed on an inner circumferential surface of said knob member and a male thread formed on an outer circumferential surface of said insert member, and thus said zero point position is set, at which said dripping oil amount is zero.

3. The apparatus according to claim 1, wherein said pressure fluid-driven apparatus is composed of a lubricator, said lubricator comprising a needle for being inserted along a needle-inserting hole, and when said lubricator is assembled, said zero point position-setting member is used to adjust a degree of insertion of said needle with respect to said needle-inserting hole so that said zero point position is set, at which said amount of oil dripped into said fluid passage is zero.

4. The apparatus according to claim 3, wherein:

said lubricator comprises a body section formed with said fluid passage for making communication between a pressure fluid-introducing port disposed on one end side and a pressure fluid discharge port disposed on the other end side, and a case section formed with a chamber connected to a lower portion of said body section, for storing lubricating oil therein;

said body section comprises a cylindrical section formed with a through-hole for making communication between said fluid passage and said chamber, and a ball member installed in said cylindrical section together with a spring member, for closing said through-hole by seating on a seat section; and said ball member is separated from said seat section in accordance with a difference in pressure between said fluid passage and said chamber, and thus any pressure remaining in said chamber is exhausted to the outside through said open through-hole.

5. The apparatus according to claim 3, wherein said lubricator comprises an inclined surface section onto which lubricating oil dripped through a gap between said needle-inserting hole and said needle falls, and a window for leading said lubricating oil fallen and scattered on said inclined surface section to said fluid passage.

6. The apparatus according to claim 4, wherein a tongue, which stands substantially perpendicularly and which is composed of a semielliptic flexible member, is provided in said fluid passage of said body, and said tongue is provided so that it is inclined in accordance with a pressing action of a pressure fluid flowing through said fluid passage.

* * * * *